Dec. 15, 1964 R. E. LA MARCHE ETAL 3,161,832

FAST-ACTING ENVELOPE DETECTOR

Filed June 22, 1962 3 Sheets-Sheet 1

INVENTORS R. E. LA MARCHE
C. F. SIMONE
BY Leonard M. Arnold
ATTORNEY

INVENTORS R. E. LA MARCHE
C. F. SIMONE
BY Leonard U. Arnold
ATTORNEY

INVENTORS R. E. LA MARCHE
C. F. SIMONE
BY [signature]
ATTORNEY

United States Patent Office 3,161,832
Patented Dec. 15, 1964

3,161,832
FAST-ACTING ENVELOPE DETECTOR

Robert E. La Marche, Berkeley Heights, and Carl F. Simone, Florham Park, N.J., assignors to Bell Telephone Laboratories, Incorporated, New York, N.Y., a corporation of New York Filed June 22, 1962, Ser. No. 204,516
3 Claims. (Cl. 329—178)

This invention relates to detectors and more particularly to detectors for both large and small amplitude signals where the highest modulating frequency is not much less than the carrier frequency.

Generally speaking, detectors for amplitude modulation may be categorized as follows: (1) small signal detectors, and (2) large signal or linear detectors. Small signal detectors operate by utilizing the curvature of the volt-ampere characteristic of some device and are generally satisfactory only for detecting relatively small signals. The large signal or linear detector, on the other hand, utilizes the linearity of the volt-ampere characteristic of some device and may comprise a diode rectifier in conjunction with a low-pass filter. When such a large signal detector is employed to demodulate a large signal carrier where the highest modulating frequency is not much less than the carrier frequency, certain requirements must be satisfied. First, the large signal detector must be capable of attenuating the carrier signal without distorting the modulation information. Since some of the information is closely spaced to the carrier signal in the frequency domain this results in the requirement that the low-pass filter employed approach an ideal filter in its characteristics. Even if such an ideal low-pass filter were available, however, it has a poor transient response when required to respond to signals having components both inside and outside its passband. Therefore the use of an ideal low-pass filter and an ideal diode rectifier, i.e., one whose volt-ampere characteristic is perfectly linear, is generally not satisfactory in the case of relatively large signals where the highest modulation frequency and the carrier frequency are closely spaced.

It is an object of this invention to eliminate the poor transient response usually associated with large signal detectors.

It is a related object of this invention to provide a detector for both large and small signals which is capable of demodulating signals where the modulating signal is close to the carrier signal in the frequency domain.

In accordance with this invention a large signal envelope detector is provided which utilizes two circuits in order to detect amplitude modulated signals. The first circuit compares the amplitude of the input signal to the output of the detector and rapidly increases that output in the event the input signal increases. The second circuit senses decreasing input signal amplitudes by comparing the input signal with a predetermined portion of the output signal, the comparison yielding a prediction of the new value of the input signal to which the output of the detector is rapidly driven. A detector embodying this invention has an excellent transient response, operates equally well whether detecting large or small signals, and is capable of demodulating signals where the modulating signal is close to the carrier signal in the frequency domain.

The invention will be more fully comprehended from the following detailed description taken in conjunction with the drawings, in which.

Figures 1, 3:
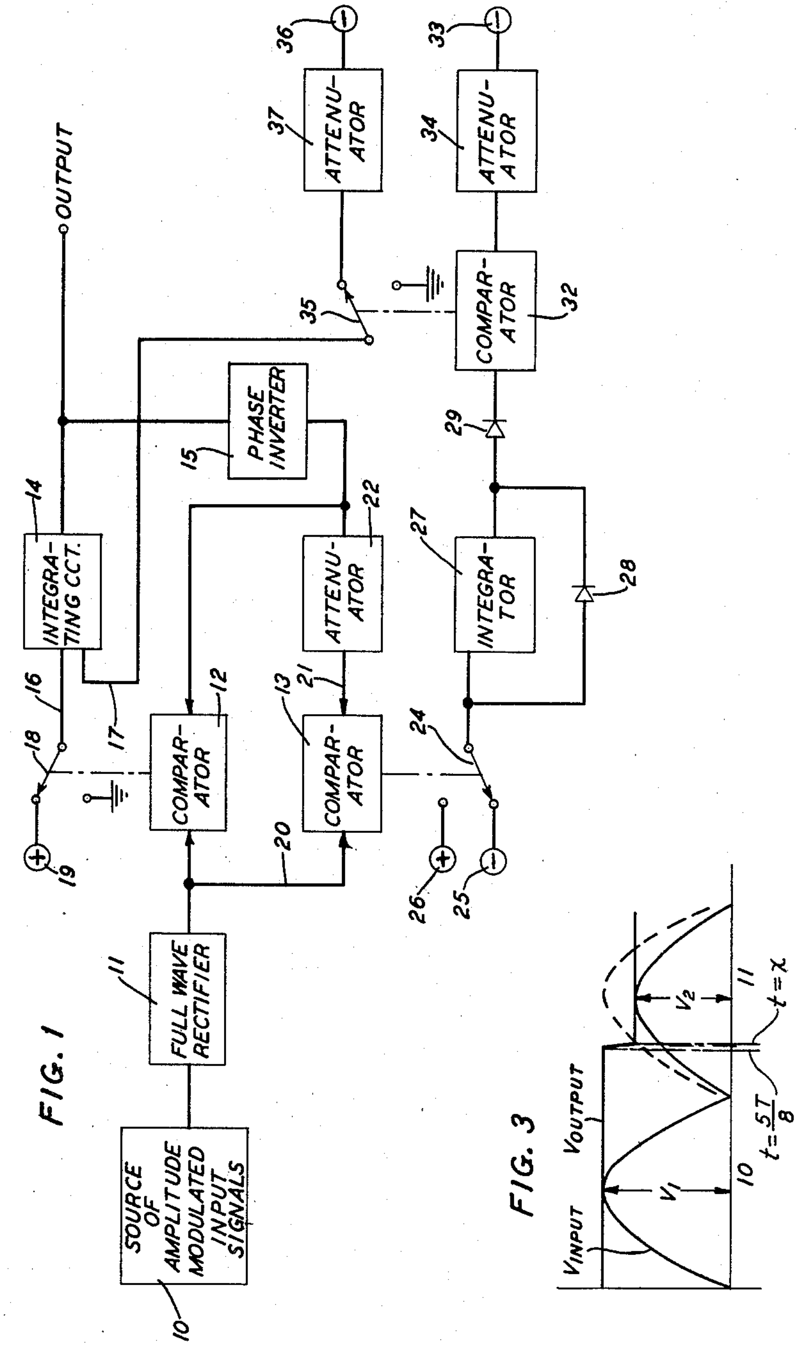
FIG. 1 is a block diagram of an envelope detector embodying this invention.
FIG. 3 illustrates the manner in which a detector embodying the invention predicts the new peak voltage of the input signal when the input signal decreases in magnitude.

The theory of operation of an envelope detector embodying this invention may be most easily understood if the amplitude modulated output signal to be demodulated is first considered to be a sinusoidal carrier signal. The sinusoidal carrier signal from source 10, shown in FIG. 1, is first rectified by a full wave rectifier 11, whose output is connected to two comparator circuits 12 and 13. The rectifier carrier signal is shown in line *a* of FIG. 2 and to facilitate explanation of the invention, each half sinusoid of that signal has been numbered. Each comparator circuit may be, for example, a summing amplifier having two input terminals and an output terminal at which a signal whose amplitude is the algebraic sum of the input signals is present. The second input terminal to comparator 12 is connected to the output terminal of a multi-input terminal integrating circuit 14 by means of a phase inverter circuit 15. The integrating circuit 14 may comprise, for example, the series combination of a summing amplifier and an integrator circuit with the output of the summing amplifier connected to the input of the integrator circuit. A positive voltage input signal applied to the input terminal 16 of the integrating circuit 14 raises the output voltage of integrating circuit 14.

When the input signal is first applied to the detector circuitry the output of integrating circuit 14 is at zero volts. Since the rectified input signal exceeds the output voltage of integrating circuit 14 the sum of the input signal and the inverted output signal applied to comparator 12 is a net positive voltage at the output terminal of comparator 12, and comparator 12 actuates switch 18 and connects the input terminal 16 of integrating circuit 14 to a source of positive voltage 19. The application of a positive voltage to input terminal 16 of integrating circuit 14 causes the output voltage of integrating circuit 14, which is shown in line *f* of FIG. 2, to rise very rapidly so that by the time the rectified input signal has reached the peak value, $V_0$, of the first half sinusoid shown in line *a* of FIG. 2, the output of the integrating circuit 14 has almost reached the peak value, $V_0$, of the rectified input signal. After the instantaneous value of the rectified input signal has begun to decline after reaching the peak value of the first half sinusoid, the output of integrating circuit 14 exceeds the instantaneous rectified input signal and comparator 12 now produces a negative output voltage which disconnects switch 18 from the source of positive voltage 19. Thus, during the time that the rectified input signal is declining from the peak value of the first half sinusoid until the time that the rectified input signal is approaching the peak value, $V_0$, of the second half sinusoid the output voltage of the integrating circuit 14 remains at its previously achieved value. When the instantaneous value of the rectified input signal approaches the peak of the second half sinusoid the output voltage of the comparator circuit 12 is again a positive voltage because the amplitude of the inverted output signal is less than the input signal. Comparator 12 again actuates switch 18 so that a source of positive voltage 19 is again connected to the input terminal 16 of integrating circuit 14 so that by the time the rectified input signal has reached the peak of the second half sinusoid the output of the integrating circuit 14 is substantially equal to the peak voltage, $V_0$, of the second half sinusoid. It should be understood that by increasing the magnitude of the voltage of positive voltage source 19 or reducing the time constant of integrating circuit 14 the output voltage of integrating circuit 14 may be made to reach the peak value of the first half sinusoid during that first half sinusoid.

The above-described circuitry functions only in the event that the rectified input signal exceeds the output voltage of the integrating circuit 14. When, for example, the rectified input signal increases in peak amplitude during the sixth half sinusoid the switch 18 is again actuated so that source 19 is connected to the input terminal 16 of integrating circuit 14, and the output voltage of integrating circuit 14 increases to the new peak voltage, $V_1$, of the input signal.

Figure 2:
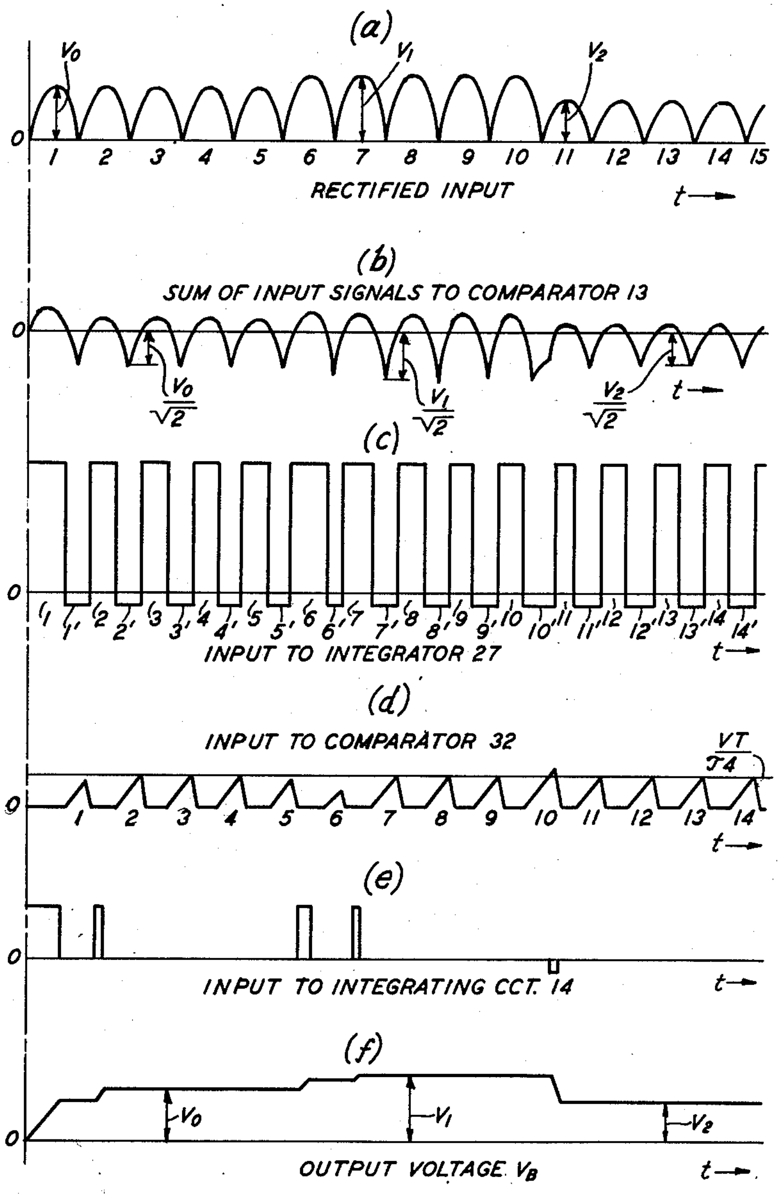
FIG. 2 shows a series of waveforms illustrating the operation of the embodiment of the invention depicted in FIG. 1.

In accordance with the invention, to reduce the output voltage of integrating circuit 14 when the modulated sine wave carrier signal decreases in the amplitude, comparator circuit 13 and its associated circuitry are provided. The rectified input signal is applied to one input terminal 20 of comparator 13 and the output signal from integrating circuit 14 is applied to a second input terminal 21 of comparator 13 by means of an attenuator 22 which divides the amplitude of the output signal by $\sqrt{2}$. The resulting input signal to comparator 13 is the input signal from rectifier 11 which has subtracted from it the signal $$\frac{V}{\sqrt{2}}$$

where V is the peak value of the output signal from integrating circuit 14. This resulting signal, which is shown in line *b* of FIG. 2, is zero at time 0, $3T/8$, $5T/8$, $7T/8$, etc., where T is the period of the amplitude modulated signal. When this net signal is negative, comparator 13 actuates switch 24 to connect a source of negative voltage 25 to the input of integrator circuit 27. The application of a net negative voltage to the input of integrator circuit 27 causes diode 28 to be reverse biased and diode 29 to be forward biased, due to phase reversal in the integrator circuit. As a result the output voltage of integrator circuit 27 increases. When the net input signal to comparator 13 is positive, comparator 13 actuates switch 24 and connects it to a source of positive voltage 26, and the output voltage of integrator circuit 27 now decreases to the voltage at which it is clamped by diode 28. Diode 29 is reversed biased by the voltage to which integrator circuit 27 is clamped so that the input to comparator 32 is zero volts. The rectangular input signal to integrator circuit 27 in response to the net input signal to comparator 13 is shown in line *c* of FIG. 2 and, as a result of the above-described operation, the input signal which is applied to comparator 32 is as shown in line *d* of FIG. 2.

When the input signal is of constant amplitude the output of integrator circuit 27 reaches a maximum voltage of $VT/\tau 4$ where T is the period of amplitude modulated signal, V is the voltage of the negative source 25, which is connected to the input of integrating circuit 27 when the net input signal to comparator 13 is negative in amplitude, and $\tau$ is the time constant of integrator circuit 27. The output of integrator circuit 27 is compared with a voltage equal to $$-\frac{VT}{\tau 4}$$

by means of comparator 32 in order to ascertain when the input signal decreases in amplitude. The voltage $$-\frac{VT}{\tau 4}$$

is obtained from a source 33 of —V volts which is then passed through an attenuator 34 so that the output of the attenuator 34 applied to comparator 32 is equal to $$-\frac{VT}{\tau 4}$$

volts. Comparator 32 may be, for example, a summing amplifier circuit.

In the event that the input signal, such as during the sixth half sinusoid, increases, this increased voltage delays the next zero crossing of the waveform shown in line *b* of FIG. 2, producing a wider positive pulse of the input signal to integrator circuit 27 than would be the case if the amplitude of the input signal had remained constant. This wider pulse is numbered 6 in line *c* of FIG. 2 and is a result of the greater amplitude of the sixth half sinusoid shown in line *a* of FIG. 2 as compared to the fifth half sinusoid. As a result the negative excursions of the input signal to integrator circuit 27 both immediately before and immediately after the sixth pulse in line *c*, which are labeled 5′ and 6′, are shorter in duration and the input signal to comparator 32 during this interval is less than $VT/\tau 4$. This results in the triangular pulses in line *d* having a lesser amplitude until the action of comparator 12 increases the output of integrating circuit 14 so that the zero crossings of the net input signal to comparator 12 again occur at intervals of time, $T/4$.

When the amplitude of the sine wave carrier signal decreases, as happens during the eleventh half sinusoid shown in line *a* of FIG. 2, then the input signal to comparator 13, shown in line *b* of FIG. 2, decreases, which increases the duration of the preceding negative excursion 10′ of the input signal to integrator circuit 27. As a result, the tenth triangular pulse shown in line *d* of FIG. 2 exceeds $VT/\tau 4$ volts. Comparator 32 actuates switch 35 so that input terminal 17 of integrating circuit 14 is now connected to a source of negative voltage 36 by means of an attenuator 37. This causes the output voltage of the integrating circuit 14 to decrease until it reaches the new value of the peak amplitude of the input signal. The negative voltage which is applied to integrating circuit 14 during the occurrence of the eleventh half sinusoid is shown at that time in line *e* of FIG. 2. When the output voltage reaches the new peak value of the input signal the zero crossings of the net input signal to comparator 13 again occur at equal intervals of time, $T/4$, and switch 35 opens. Thus the output of integrating circuit 14 yields the envelope of the input signal.

In addition to the ability to rapidly follow decreasing envelopes as described, a detector embodying this invention senses a decrease in the voltage of the input signal and adjusts the output voltage of integrating circuit 14 to the value of the new peak voltage before the new peak voltage actually occurs. In short, the value of the new smaller peak is predicted before it occurs and the output of integrating circuit 14 is driven to that value.

To understand this phenomenon, reference should be made to FIG. 3, in which the tenth and eleventh rectified half sinusoids are shown. The dotted half sinusoid is the rectified input signal in the event that there had been no change in the input signal from the tenth to eleventh half sinusoid. In FIG. 3 it is seen that the output voltage during the tenth half sinusoid is equal to the peak of that half sinusoid. As a result of the drop in voltage of the input signal from $V_1$ to $V_2$ volts, after time $$t=\frac{5T}{8}$$

the input to comparator 32 from integrating circuit 27 exceeds $VT/\tau 4$ volts, and switch 35 closes connecting negative voltage source 36 to integrating circuit 14 so that the output voltage begins to drop rapidly.

Between the time interval 5T/8 and the time *x*, the output voltage of comparator 13 is still negative and as a result the output voltage continues to drop. At a time *x*, at which the input voltage is equal to the output voltage divided by $\sqrt{2}$, the net input to comparator 13 is zero. Switch 24 at that time disconnects the source of negative voltage 25 from the input to integrator circuit 27 and connects the source of positive voltage 26. Thus the output of integrator circuit 27 falls to zero volts and switch 35 is opened so that the output voltage of integrating circuit 14 ceases to decrease in amplitude. The value at which the output voltage ceases to decrease in magnitude is equal to the new peak value of the voltage of the input signal. As is evident from FIG. 3 the output voltage has declined to the peak value $V_2$ of the eleventh half sinusoid prior to the input voltage actually attaining that peak voltage. This property of predicting the new peak value of the input signal enhances the ability of a circuit embodying the invention to handle rapidly decreasing waveforms, and because of the rapid transient response of the detector it is capable of demodulating signals where the frequency of the carrier signal is close to that of the modulating signal.

Figure 4:
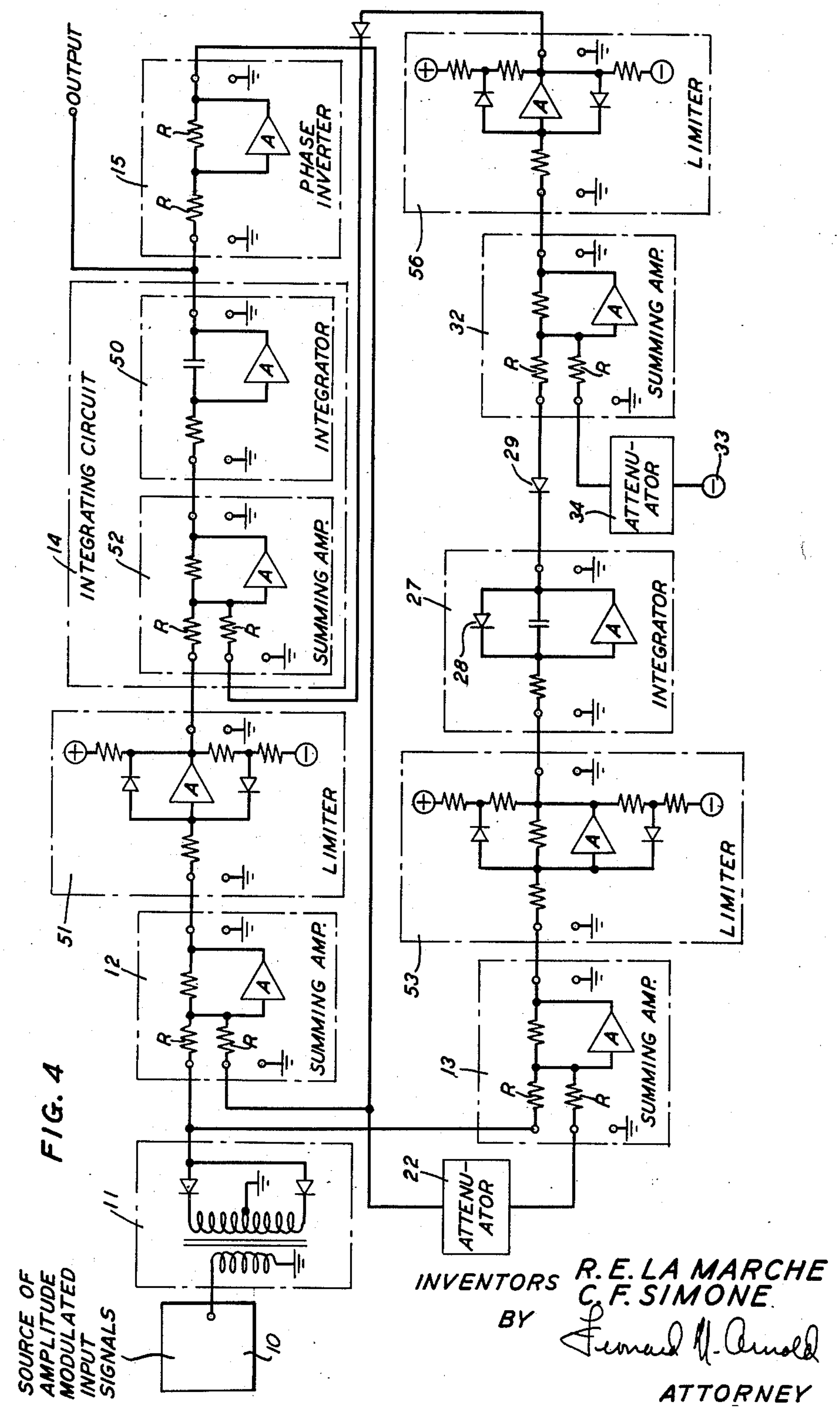
FIG. 4 is a more complete schematic diagram of the envelope detector illustrated in FIG. 1.

FIG. 4 is a more detailed schematic drawing of the envelope detector embodying the invention illustrated in FIG. 1. The input signal from source 10 is applied to a full wave rectifier 11 whose output terminal is connected to one input terminal of a summing amplifier 12 which may be, for example, the summing amplifier shown in FIG. 2.2.1(*d*) on page 2–9 of the Computer Handbook, edited by H. D. Husky and G. A. Korn, published by the McGraw-Hill Book Company, 1962. The summing amplifier performs the function of comparator 12 shown in FIG. 1. The second input to the summing amplifier 12 is the output signal from an integrator circuit 50 which may be, for example, that shown in FIG. 2.2.1(*e*) on page 2–9 of the above reference. Before being applied to the summing amplifier 12 the output signal from integrator circuit 50 is inverted by passing it through a phase inverter 15 which is shown in FIG. 2.2.1(*b*) on page 2–9 of the above reference. The input resistors R of the summing amplifier 12 are of equal resistance so that the summing amplifier has the same amplitude response to either of these two input signals.

The output terminal of the summing amplifier 12 is applied to a so-called limiter 51 such as that shown in FIG. 3.3.1(*m*) on page 3–65 of the above reference. Thus when the output signal of integrating circuit 14, inverted by phase inverter 15, is less in absolute magnitude than the signal from the rectifier 11 the summing amplifier 12 produces an output voltage which is negatively proportional to the magnitude of the amount by which the input signal exceeds the output signal. As a result the limiter 51 supplies a positive output voltage, due to the phase reversal, from its high negative gain amplifier, which is applied to a summing amplifier 52 whose output is a negative voltage. Limiter 51, therefore, performs the function of switch 18 and voltage source 19 shown in FIG. 1. The output of summing amplifier 52 is applied to integrator circuit 50 and drives the integrator output voltage more positive. The summing amplifier 52 and integrator 50 together comprise integrating circuit 14 shown in FIG. 1. Thus, in accordance with this invention, whenever the output voltage is less than the peak voltage of the input signal, the above-described circuitry rapidly drives the output voltage to the peak value of the input signal.

The output of phase inverter 15 is also applied by means of attenuator 22 to one input terminal of summing amplifier 13 whose second input terminal is connected to the output terminal of rectifier 11. The summing amplifier 13 functions as the comparator 13 shown in FIG. 1. The input resistors R of the summing amplifier 13, which determine the relative manner in which the input signals are added, are equal in value so that the output of the summing amplifier is a signal which is equal to the sum of the input signals. Since the output of integrator circuit 50 has been inverted by phase inverter 15 and attenuated by a factor of $\sqrt{2}$ by attenuator 22, the output of the summing amplifier 13 is the inverse of the waveform shown in line *b* of FIG. 2 due to the action of the high negative gain amplifier in the summing amplifier. The output of the summing amplifier 13 is applied to the input of a limiter 53. The output of the limiter has a rectangular voltage waveform as shown in line *c* of FIG. 2. Thus limiter 53 performs the function performed by the combination of switch 24 and voltages 25 and 26 shown in FIG. 1. The output terminal of the limiter 53 is connected to the input terminal of integrator circuit 27. The voltage applied to the integrator circuit 27 produces the voltage waveform shown in line *d* of FIG. 3, but which is inverted in polarity due to the action of the high negative gain amplifier circuit employed in the integrator circuit. This output voltage is in turn applied to one input of a summing amplifier 32 by means of a diode 29. The summing amplifier 32 functions as comparator 32 shown in FIG. 1 and its second input terminal is connected to the output of attenuator 34. The summing amplifier 32 produces a positive voltage output whenever the attenuator voltage output is less in absolute magnitude than the integrator output voltage. This positive voltage, which indicates that the output voltage of the envelope detector exceeds the input, is applied to a limiter 56 which generates a negative voltage in response thereto. This negative voltage is applied to the input of summing amplifier 52 and drives the output voltage of integrating circuit 14 in the negative direction. The limiter 56 performs the functions performed by the combination of switch 35, attenuator 37 and voltage source 36 in FIG. 1.

In accordance with the invention, therefore, an envelope detector, employing electronic switches, which is capable of detecting relatively large signals is provided and such a detector has an excellent transient response which is generally not the case with the large signal detectors of the prior art. In addition, a detector embodying the invention is capable of detecting amplitude modulated signals where the modulating signal is close to the carrier signal in the frequency domain because of the very fast transient response of the detector.

While the invention has been explained in terms of a sinusoidal carrier signal input it should be understood that this invention is not limited to such an input waveform. This invention is generally applicable to any periodic carrier waveform. Assuming an arbitrary periodic carrier waveform, the attenuator 22 is adjusted so that the zero crossings of the output signal of summing amplifier 13 are equally spaced in the time domain and the attenuator 34 is then adjusted so that the output of integrator circuit 27 is compared with a voltage equal to $$-\frac{VT}{\tau 4}$$

volts, where T is the period of the carrier waveform and $\tau$ is the time constant of integrator circuit 27. It should be emphasized, however, that there is no requirement that the net input signal to summing amplifier 13 have equal intervals of time between zero crossings and the attenuator 22 may be adjusted to any value which has a single positive going and a single negative going crossing of the input signal during each half cycle of the input signal. Once the attenuator 22 is adjusted to such a value then it is merely necessary to adjust attenuator 34 so that the output of integrator circuit 27 is equal to the output voltage from the attenuator 34 when there has been no change in peak amplitude of the input signal.

Thus, a detector embodying this invention is capable of demodulating carrier signals of any periodic waveform and of any amplitude, and is not limited by the fact that the modulating signal is close to the carrier signal in the frequency domain.

It is to be understood that the above-described arrangements are illustrative of the application of the principles of the invention. Numerous other arrangements may be devised by those skilled in the art without departing from the spirit and scope of the invention.

What is claimed is:

1. A fast-acting envelope detector comprising, in combination, a source of amplitude modulated carrier input signals, an integrating circuit, means connected between said source of input signals and said integrating circuit to detect when the peak voltage of said source of input signals exceeds the output voltage of said integrating circuit, means responsive to said detection means to increase the output voltage of said integrating circuit when the peak voltage of said input signal exceeds the output voltage of said integrating circuit, second detection means to detect when said peak voltage of said input signal is less than the output voltage of said integrating circuit and to predict the new peak voltage of said input signal, and means responsive to said second detection means to reduce the output voltage of said integrating circuit to the new predicted value of said peak voltage of said input signal when the peak voltage of said input signal falls below the output voltage of said integrating circuit.

2. A fast-acting envelope detector comprising, in combination, a source of amplitude modulated carrier input signals, a first circuit to which said source of amplitude modulated carrier signals is applied comprising a first integrator circuit, and a first comparator circuit which compares the output voltage of said first integrator circuit with the voltage of said input signal source and generates a signal to increase the output voltage of said first integrator circuit when the peak voltage of said input signal is greater than the output voltage of said integrator circuit, a second circuit to detect when said peak voltage of said input signal is less than the output voltage of said integrator circuit and to predict the new peak voltage of said input signal comprising a second comparator to which said carrier input signal and a predetermined portion of said output voltage of said first integrator circuit are applied, a second integrator circuit connected to the output of said second comparator circuit to generate an output signal whose amplitude is proportional to the amount by which the output voltage of said first integrator circuit exceeds the peak voltage of said input signal, third comparator means to compare the output voltage of said second integrator circuit with a predetermined constant voltage to determine when said carrier input signal is less than the output voltage of said first integrator circuit and means connecting the output of said third comparator means to said first integrator circuit to cause the output voltage of said first integrator circuit to decrease when said input signal decreases in voltage.

3. A fast-acting detector comprising, in combination, a source of amplitude modulated carrier input signals, a first circuit to which said source of amplitude modulated carrier signals is applied comprising a first integrator circuit, and a first comparator circuit which compares the output voltage of said first integrator circuit with the peak voltage of said carrier input signal and generates a signal to increase the output voltage of said first integrator circuit when said peak voltage of said input voltage is greater than the output voltage of said first integrator circuit, a second circuit to detect when said peak voltage of said input signal is less than the output voltage of said integrator circuit and to predict the new peak value of said input voltage comprising a second comparator to which said input signal and a portion of the output voltage of said first integrator are applied, a second integrator circuit connected to the output of said second comparator circuit to integrate negative voltage areas of the signal generated by said second integrator circuit and generate an output signal whose amplitude is proportional to the decrease in peak input signal amplitude, a third comparator circuit to compare the output voltage of said second integrator circuit with a predetermined constant voltage of such value as to cause said third comparator circuit to generate an output signal when said peak value of said input signal decreases, and means connecting the output of said third comparator circuit to the input of said first integrator circuit to cause the output voltage of said first integrator circuit to decrease when said input signal decreases in voltage.

References Cited in the file of this patent

UNITED STATES PATENTS 3,020,397 Pierce et al. ------------ Feb. 6, 1962